March 28, 1961 W. RODDER 2,976,980
ROTARY KICK-OFF FOR COOLING BEDS
Filed Jan. 19, 1959 3 Sheets-Sheet 1
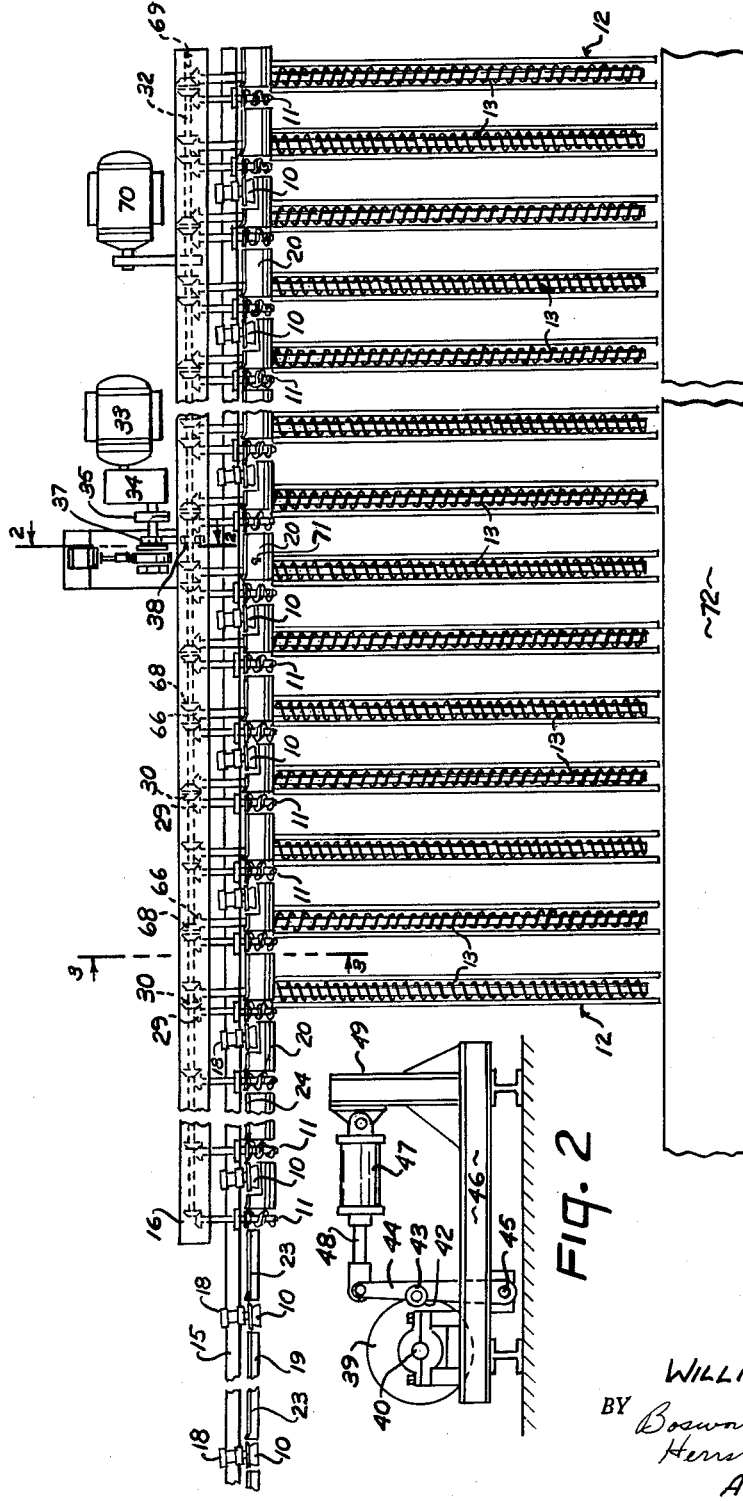
INVENTOR.
WILLIAM RODDER
BY Boswrth, Sessions,
Herrstrom + Knowles
ATTORNEYS March 28, 1961 W. RODDER 2,976,980
ROTARY KICK-OFF FOR COOLING BEDS
Filed Jan. 19, 1959 3 Sheets-Sheet 2
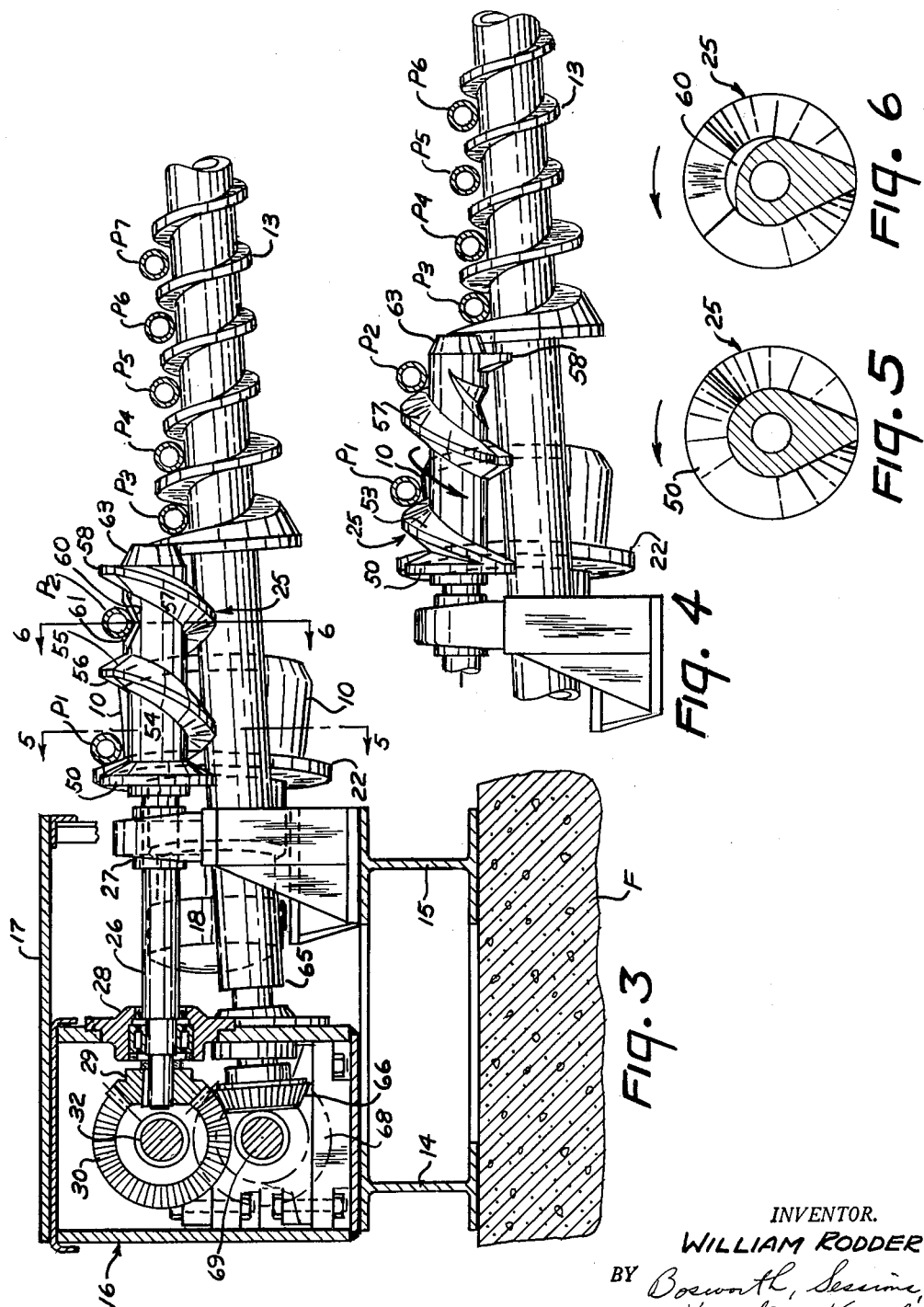
INVENTOR.
WILLIAM RODDER
BY Bosworth, Sessions,
Herrstrom + Knowles
ATTORNEYS

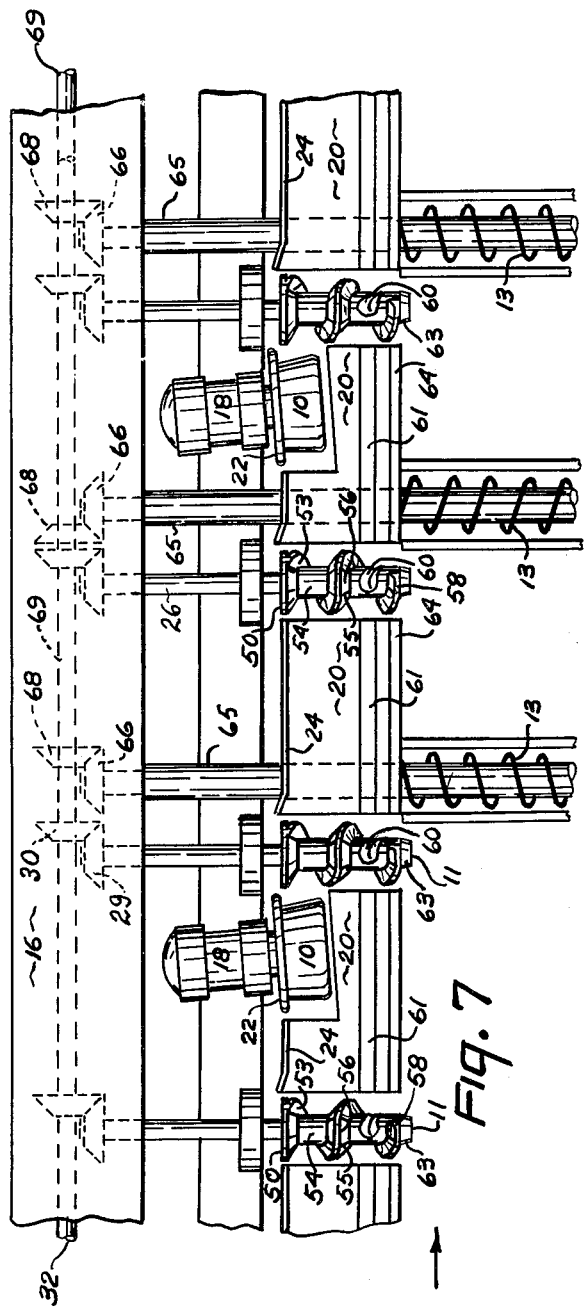

United States Patent Office 2,976,980
Patented Mar. 28, 1961

2,976,980
ROTARY KICK-OFF FOR COOLING BEDS

William Rodder, Poland, Ohio, assignor, by mesne assignments, to Blaw-Knox Company, Pittsburgh, Pa., a corporation of Delaware Filed Jan. 19, 1959, Ser. No. 787,431

4 Claims. (Cl. 198—104)

This invention relates to conveyors for pipe, tube, rod and the like and more particularly to a kickoff apparatus adapted to transfer rapidly moving lengths of pipe, tube, rod or other elongated work pieces from a conveyor on which they are travelling in rapid succession in an axial path and deposit them on another conveyor, such as a cooling bed or the like, on which they are carried in a direction transverse to their axes and to their original direction of movement. The invention is described herein as applied to the production of welded pipe but it is to be understood that the invention may be adapted to other purposes and uses. The invention described herein constitutes an improvement upon the rotary kickoff for cooling beds disclosed and claimed in my Patent No. 2,726,754 issued December 13, 1955, and assigned to the assignee of the present application.

It is possible to produce butt welded pipe at very high rates of speed by a well known process in which skelp is heated nearly to welding temperature in a furnace and then passed through forming and welding rolls, the edges of the skelp being brought up to welding temperature and welded together at the welding rolls to form pipe. The operation is carried out continuously and welding mills are capable of operation at speeds of one thousand or more feet per minute. Because of the high rate of production, the disposition of the pipe as it leaves the welding mill at a high temperature is a major problem. In modern mills it is the practice to saw or shear the pipe into commercial lengths of, for example, 20 to 40 feet as the pipe leaves the welding mill. The sawing operation is carried out without stopping the pipe. The rapidly moving lengths of pipe severed by the saw are moved successively onto a cooling bed or other conveyor where they are moved transversely of their axes and while so moving are permitted to cool. The problem of transferring th pipes onto the cooling bed is a difficult one because of the fact that the successive lengths of pipe follow each other at close intervals and at high speed. If a length of pipe that is travelling at a high speed inadvertently strikes a portion of the apparatus or another length of pipe, the rapidly moving length may take an erratic path, creating a serious hazard to the operator. Also, a large number of lengths of pipe may become jammed in a very short time, making it necessary to stop the entire mill while the jam is being cleared, resulting in an expensive loss of production.

According to the invention of my aforesaid Patent No. 2,726,754, many of the difficulties and disadvantages of prior types of apparatus are eliminated and high speed operation is made possible by providing a kickoff mechanism in which a series of rotating cams move each length of pipe bodily laterally when the length reaches a predetermined point in the apparatus. The leading end and the trailing end, as well as intermediate portions of the pipe, are moved out of the main line of longitudinal travel simultaneously. The longitudinal or axial motion of the lengths of pipe is gradually stopped and the lengths are moved transversely step by step until they are deposited on the cooling bed conveyor in a transversely spaced arrangement.

According to my prior patent this operation is accomplished by means of a series of spaced screw-like cam members disposed in alignment with the axial path of movement with the pipe sections; the cams, as shown in patent, have threads arranged so that the necessary transverse movement of the pipe sections is obtained by rotating the cams in a direction such that the portions of the cams that engage the pipe sections are moved in the same lineal direction as the pipe sections; in other words, the cams rotated with the axial motion of the pipe sections.

According to a preferred form of the present invention an apparatus having basically the same general arrangement is employed, but the cams have their threads and their direction of rotation reversed so that the cams rotate against the axial motion of the pipe sections; that is, the portions of the cams that engage the pipe sections are moved in a lineal direction opposite to the lineal direction of movement of the pipe sections when the cams are operated to move the pipe sections transversely out of their original path. This change, for reasons that appear more fully below, gives unexpectedly advantageous results in the operation of the apparatus.

A general object of the invention is the provision of an improved kickoff apparatus that is adapted to move successive lengths of rapidly moving pipe, tube, rod or the like from a longitudinal conveyor transversely of their axes and deposit them successively on a transverse conveyor such as a cooling bed. Further objects and advantages of the invention will become apparent from the following description of a preferred form thereof, reference being made to the accompanying drawings in which:

Fig. 1 is a plan view of an apparatus embodying the invention.

Fig. 2 is a somewhat diagrammatic illustration of a portion of the drive mechanism of Fig. 1, the view being taken as indicated by line 2—2 of Fig. 1.

Fig. 3 is a cross section on an enlarged scale taken as indicated by the line 3—3 of Fig. 1, showing one of the kick-off cams.

Fig. 4 is a similar cross sectional view but showing the cam rotated toward the viewer approximately 180°.

Figs. 5 and 6 are enlarged cross sectional details of one of the cams, taken as indicated by the lines 5—5 and 6—6 of Fig. 3.

Fig. 7 is a fragmentary plan view on an enlarged scale showing a portion of the apparatus illustrated in Figs. 1 and 3, and Fig. 8 is a diagram showing the manner in which the lengths of pipe travel through the apparatus.

As noted above, the present apparatus, except for the particular construction and direction of rotation of the cams, may be essentially the same as the apparatus of my aforesaid prior patent and is especially adapted for use in connection with high speed pipe mills in which pipe is produced continuously at speeds of, for example, 1,000 feet per minute, severed into commercial lengths of, for example, 20 to 40 feet while it is very hot and then discharged laterally onto a cooling bed. Fig. 1 of the drawings illustrate the apparatus as adapted to receive lengths of pipe which are delivered from a butt weld pipe mill and a flying hot saw, neither of which are illustrated herein, to a longitudinal or axial conveyor made up of conveyor rolls 10 which carry the successive lengths of pipe at high speed to the kickoff section in which they are moved transversely by the cams 11 and deposited upon a transverse conveyor such as a cooling bed indicated in general at 12. The cooling bed comprises a series of conveyor screws 13, alternate screws being of opposite hand and being rotated in opposite directions as is conventional in cooling beds of this type.

The apparatus as a whole may be many feet long and comprises longitudinally extending frame members 14 and 15 supported on a foundation structure F (see Fig. 3). Frame member 14 carries a hollow elongated housing 16 which extends for the length of the apparatus and contains within it the mechanism for driving the cams 11 and the cooling bed conveyor screws 13; a catwalk 17 may be supported on the housing 16 as shown in Fig. 3; this catwalk has been omitted from Figs. 1 and 7 for convenience of illustration.

The conveyor rolls 10 are preferably driven by individual electric motors 18 which are supported on the frame member 10. Between the conveyor rolls 10 there are stationary guides 19 and 20 for the pipe. Frame member 15 continues on toward the welding mill and saw beyond the end of the housing 16 as shown, a number of rolls 10 and stationary guides 19 being required in the conveyor section of the apparatus to convey the lengths of pipe from the saw to the cams 11 in the kickoff section of the apparatus.

After the pipe has been severed into lengths by the hot saw, the individual lengths travel over rolls 10 and guides 19 and 20 until they are discharged laterally by the cams 11. In order to space the ends of successive lengths apart and thus to give the cams time to operate, the conveyor rolls 10 are driven at a speed somewhat higher than the speed of the pipe as it leaves the mill; for example, with the mill operating at 1,000 feet per minute the conveyor rolls 10 may be driven by the motors 18 at a lineal speed of say 1,200 feet per minute. It will also be noted that the axes of the rolls 10 are slightly askew and that the pipe-engaging surfaces of the rolls are conical. These features tend to hold the lengths of the pipe on the rolls in contact with or near the flanges 22 of the rolls and the vertical flanges 23 and 24 of the guides 19 and 20.

In order to move each length of pipe transversely of its own axis and thus bodily out of the path of the succeeding lengths, the cams 11 are disposed in alignment with the path of the pipe as defined by rolls 10 and guides 19, alternating with the conveyor's rolls 10 throughout the length of the kickoff section of the apparatus. Preferably the cams are provided with threads 25 in the form of modified helixes as shown particularly in Figs. 3, 4, 5 and 6, and as described in detail below. As mentioned above, the construction and direction of rotation of the cams distinguish the present invention from the invention of my Patent No. 2,726,754. The cams 11, as in the case of the cams in my patent, are arranged so that in idle position they provide a clear path for longitudinal movement of the lengths of pipe, while upon rotation of all of them simultaneously, preferably through one complete revolution, the length of pipe adjacent the cam members is moved bodily out of its line of travel and transversely of its own axis a distance sufficient to permit the immediately following length of pipe to overtake it without interference. The arrangement preferably is such that the pipe is moved step by step, the first step being to a point where the pipe is still in engagement with the cams but out of engagement with the conveyor rolls 10 and out of the line of travel of the succeeding length. The succeeding step discharges the pipe onto the cooling bed.

Each cam 11 as shown in Figs. 3, 4 and 7, is supported by a shaft 26 carried by suitable bearings 27 and 28 mounted on frame member 15 and in housing 16 respectively. The inner end of each shaft is provided with a bevel gear 29, which meshes with a bevel gear 30 keyed to a line shaft 32. Line shaft 32 is driven by motor 33 through reduction gearing 34, a single revolution clutch 35 and gears 37 and 38. The clutch 35, which may be of conventional construction, is controlled by the pipe through means such as a flag switch or photo electric control to engage at the proper time so that the shaft 32, and correspondingly each shaft 26 and each cam 11, are rotated one revolution when the length to be discharged has reached the proper position.

In order to locate the angular position of line shaft 32 accurately at the end of each rotation thereof, the mechanism shown in Fig. 2 is preferably employed. This comprises an indexing disc 39 mounted upon a countershaft 40 which rotates at the same speed as line shaft 32. Disc 40 has a peripheral notch 42 that is engaged by a roller 43 carried by a link 44 pivoted as at 45 to a supporting frame structure 46. Link 44 is urged toward the indexing disc 39 by a pneumatic cylinder 47, a connecting rod 48 being pivoted to the upper end of link 44. The cylinder 47 is supported by the upright frame member 49. In operation, when the clutch 35 is engaged the disc 39 rotates and the roller 43 which rides on the periphery of the disc is lifted out of the notch 42 against the force exerted by the cylinder 47. The clutch is disengaged as the notch 42 approaches the roller 43 after the disc has made a single revolution. The roller 43 then drops into the notch 42 and stops the rotation of the disc 39 and shaft 40, thus accurately locating the angular position of the shaft 40 and correspondingly the angular position of line shaft 32 and the several cams 11.

The drive mechanism heretofore described is identical with that described and shown in my aforesaid Patent No. 2,726,754, except that the motor 33 and the single revolution clutch 35 in the present application rotate in a direction opposite to the direction of rotation of the corresponding parts in my patent. Thus, whereas in my patent the cams 11 rotate in the same direction as the conveyor rollers 10 so that they tend to carry the pipe sections along with them, in the present application the cams 11 rotate in the opposite direction and the motion of the cams opposes the longitudinal motion of the pipe sections. Because of the reversal in rotation, the configuration of the cams has been changed and the hand of the threads reversed from the arrangement shown in my aforesaid patent.

The configuration of the cams 11 is shown particularly in Figs. 3, 4, 5, 6 and 7. The thread 25 on each cam is in the form of a modified helix. Each thread has an inner flange portion 50 which extends throughout substantially 360° of the cam and is perpendicular to the axis of the cam. The flanges 50 are on the ends of the cams adjacent to the housing 16 and are in substantial alignment with the flanges 23 and 24 on the guides 19 and 20.

In order to move the work pieces transversely as they travel in axial directions through the apparatus, each thread has a work engaging portion or ramp 53. The ramp is helical and as shown in Fig. 7, occupies about 270° of the circumference of the cam. The ramp is formed integrally with the inner flange 50 and when the cam is in idle position as determined by the notch 42 of the indexing disc 39, the ramp starts at a position about 45° away from the vertical in a direction toward the discharge end of the apparatus. The ramp then extends beneath the hub portion 54 of the cam and terminates as indicated at 55 about 45° away from the vertical on the side of the cam toward the entry end of the apparatus. At 55 the ramp 53 joins an integrally formed intermediate flange 56 which extends through about 90° of the cam, and which, like flange 50, is perpendicular to the axis of the cam. Flange 56 is spaced from flange 50 by a distance equal to the pitch of the cam, i.e. the distance that the work is moved during one complete revolution of the cam. This distance is substantially equal to the axial length of the roll 10; thus, when the cams are in idle position, the flanges 50 and 56 define a passageway in alignment with the guides 19 and 20 and the rolls 10. As shown particularly in Fig. 3, the hub portions 54 of the cams are of such diameter that the cams do not engage the length of pipe carried by rolls 10 except as the flanges may engage incidentally as guides, the central or hub portion 54 being disposed beneath the level of the upper surfaces of the rolls 10 and beneath the level of the upper surfaces of the guides 20.

In order to move the lengths of pipe transversely another step beyond the movement provided by the ramps 53, each cam has another ramp 57 extending from the end of the intermediate flange 56 through about 270° of the cam. Ramp 57 is similar in all material respects to ramp 53 and at its end is joined to an outer flange 58 which defines a second passageway or trough for the pipe sections. Flange 58 is perpendicular to the axis of the cam and extends through about 90° of the circumference of the cam, from about 45° toward the entry end to about 45° toward the discharge end from the vertical. Preferably the hubs of the cams are cut away as indicated at 60 in Figs. 3 and 7, and the outer portion of guides 20 are longitudinally grooved as at 61 to center the lengths between the flanges 56 and 58; thus, with the cams in idle position the surfaces of the hubs are disposed beneath the level of the guides 20 and out of contact with the lengths of pipe as they slide through the space between flanges 56 and 58.

Upon rotation of the cams through 360°, a length of pipe or other elongated work piece which is being progressed through the apparatus on the rolls 10 as indicated at $P_1$ is engaged by the ramps 53 of the cams and moved to the position indicated at $P_2$ between the flanges 56 and 58. At the same time the length of pipe indicated at $P_2$ is lifted partially out of the depressions 61 in the guides 20 and engaged by the ramps 57 and moved beyond the flange 58, which has been carried out of the way by the rotation of the cam. The length rolls off the sloping ends 63 of the cams and the sloping flanges 64 of the guides 20 onto the conveyor screws 13 of the cooling bed as indicated at $P_3$. The screws are disposed slightly below the level of the cams and are preferably inclined upwardly in accordance with conventional practice. Inasmuch as these screws rotate continuously, the pipe sections are continuously carried transversely across the cooling bed, successively taking the positions shown at $P_4$, $P_5$, $P_6$, $P_7$, etc.

As noted above, the direction of rotation of the cams 11 is opposed to the motion of the lengths of pipe and is opposite the direction of rotation of the cams in my aforesaid Patent No. 2,726,754. Also, the helical ramps of the cams are of opposite hand from the cams in my patent. This reversal of the direction of rotation and of the pitch of the threads of the cams produces unexpectedly advantageous results in the operation of the apparatus. One advantage flows from the counter-rotation of the cams. It is desirable to bring the longitudinal motion of pipe lengths to a stop as quickly as possible. The rotation of the cams contrary to the direction of movement of the pipe sections assists in bringing the sections to a stop, whereas with the arrangement of my prior patent the rotation of the cams added to the forward motion of the pipe lengths.

Another important advantage flows from the arrangement of the ramps with a slope in the opposite direction from my prior patent. With this arrangement, as soon as the cam has been rotated enough to bring the ramps 53 and 57 into engagement with lengths of pipe to move them sideways, the ramps 53 present surfaces to the leading ends of the pipe lengths that tend to deflect them in the desired direction. This is particularly important for the pipes in position $P_1$ where they are travelling at high speed. It is desirable to actuate the single revolution clutch 35 so that the cams 11 are rotated as soon as the trailing end of each pipe length approaches the first of the cams 11; i.e., the cam 11 at the entry end of the kick-off mechanism. The cams must be rotated rapidly so that the ramps 53 on each cam will move out of the way of the leading end of the next succeeding pipe length and the channel between the flanges 50 and 56 will be clear to receive the succeeding pipe length. Inasmuch as the pipe lengths follow each other in close succession and continue their longitudinal motion for substantial distances in the channel between flanges 50 and 56, the ramps 53 of the cams 11 remote from the entry end of the apparatus may begin to move into the path of the leading end of a pipe length before that end has reached a particular cam. With the arrangement of my prior patent the slope of the threads was such that in that case the pipe length would be deflected inwardly toward the housing 16 instead of the desired outward direction. With the present arrangement, as shown particularly in Fig. 4, in which the cam has been rotated approximately 180°, the ramp 53 presents a sloping surface to the pipe which deflects the end of the length into the desired channel and keeps the entire pipe section moving transversely as a unit. Thus, with the present construction, it is possible to have the ramp extend through a greater portion of the circumference of the cam and to secure more reliable operation at higher pipe speeds than could be obtained with the cams of my prior patent. These advantageous results are obtained without requiring the cams to be rotated at unduly high rotational speeds.

The conveyor screws 13 are driven continuously at such rotational speeds that the pipe sections deposited on the conveyor screws are taken away from the first thread space at least as fast as the cams operate to deliver pipe sections thereto. In order to drive the screws of the cooling bed, the end portions 65 of the screws are extended through suitable bearings supported by the frame member 15 and the wall of the housing 16 into the interior of the housing. Bevel gears 66 are secured to the ends of each screw. These gears mesh with bevel gears 68 carried by line shaft 69. Line shaft 69 is mounted on appropriate bearings within the housing 16 directly above shaft 32, and is driven through conventional gearing by a motor 70. Alternate gears 68 on the shaft face in opposite directions, thereby to secure opposite rotation of alternate screws 13.

To summarize the operation of the apparatus, the lengths of pipe are conveyed rapidly along the rolls 10 as they leave the welding mill and hot saw. The rolls 10 are driven at higher speeds than the pipe leaving the hot saw so that the successive sections are spaced somewhat as shown in Fig. 8. As each length reaches the position shown at $P_1$ in Fig. 8, the leading end thereof engages a flag switch 71 or actuates a photocell or other control which, through appropriate electrical controls, causes the single revolution clutch 35 to engage. The motor 33 then rotates all of the cams 11 through 360°. This operation, as described above, moves the pipe length from position $P_1$ between flanges 50 and 56 to position $P_2$ between flanges 56 and 58. The pipe lengths travel through a substantial distance while this is going on, but if the leading end of a pipe length should encounter one or more partially rotated cams, the slope of the ramps 53 is such as to carry the leading end transversely in the same direction as the remainder of the pipe so that the entire length is moved bodily to the position shown at $P_2$ between flanges 56 and 58.

When the length is between the flanges 56 and 58, it is no longer carried by the rolls 10, but simply slides on the guides 20. Thus, the longitudinal speed of the pipe is reduced and, as diagrammatically indicated in Fig. 8, a succeeding length of pipe in position $P_1$ may overtake the length in position $P_2$. The action of the cams, however, is sufficiently rapid to remove each pipe length before the following pipe length comes into position, and to get the ramps 53 out of the way of the succeeding pipe lengths. The next operation of the cams moves the first section of pipe from position $P_2$ to position $P_3$ on the conveyor screws. Depending upon the velocity and weight of the pipe, the pipes may or may not be sliding forwardly when this takes place. The rotation of the cams, however, is against the forward movement of the pipe so that by the time the cams are deposited on the conveyor screws their forward motion, if any, is very slight.

The pipe sections are moved along the conveyor screws continuously. If they have not already come to rest, their forward movement stops because of the frictional engagement with the screws and they successively take the positions indicated at $P_4$, $P_5$, etc., ordinarily stopping their longitudinal motion with the ends of the sections substantially in alignment. The operation goes on continuously; the lengths of pipe discharged from the welding mill are accelerated longitudinally by the rolls and successively discharged transversely by the cams 11 onto the conveyor screws 13 and finally discharged from the remote ends of the conveyor screws 13 onto another conveyor or into racks 72 or the like, as required by the layout of the plant and the succeeding operations to be performed.

From the foregoing description it will be evident that I have provided an improved apparatus for rapidly discharging moving work pieces in directions transversely to their axes. The apparatus operates reliably at higher speeds than have been attainable with devices heretofore known in the art. The invention has been described herein in its application to the manufacture of pipe, but those skilled in the art will appreciate that it may be adapted to other purposes and uses, and that various changes in modifications may be made in the preferred form of the invention described herein without departing from the spirit and scope thereof.

I claim:

1. In an apparatus of the type described having a longitudinal conveyor comprising a series of driven rolls adapted to convey successive lengths of pipe or the like in a path aligned with the axes of the lengths, a series of helical cams alternating with said rolls at one end of said longitudinal conveyor, and a transverse screw conveyor disposed adjacent said cams adapted to convey successive lengths of pipe transversely of their axes and transversely of said longitudinal conveyor, said cams each having a hub portion and a single continuous thread extending outwardly therefrom, said thread having flange portions in one position defining both sides of an unobstructed path in alignment with said longitudinal conveyor and having a helical portion extending between said flange portions, the pitch of said helical portion being such that upon rotation of the cam in a direction opposed to the longitudinal movement of the lengths, said helical portion moves into said path and engages a length of pipe disposed in said path and moves it toward said transverse conveyor, and power means for rotating said cams through a single revolution in said direction.

2. In an apparatus of the type described having a conveyor for conveying successive lengths of elongated material in an axial direction, a conveyor for conveying said lengths in a direction transverse of their axes, means for transferring said lengths from the axial conveyor to the transverse conveyor while maintaining the lengths parallel to their original direction of travel comprising a series of spaced screw-like cam members disposed in alignment with said axial conveyor with their axes substantially perpendicular thereto and alongside of said transverse conveyor, each cam member having a thread that in idle position defines, by flange portions lying on both sides thereof, an unobstructed passageway in alignment with said axial conveyor and having a ramp portion that upon rotation of said cam member through one complete revolution in a direction opposed to the axial movement of said lengths engages a length disposed in said passageway to move said length transversely of its axis toward said transverse conveyor and out of the path of a succeeding length carried by said axial conveyor, and means for rotating said cams through a single revolution in said direction and stopping them in said idle position.

3. In an apparatus of the type described having a conveyor for conveying successive lengths of elongated material in an axial direction and a conveyor for conveying said lengths in a direction transverse of their axes, means for transferring said lengths from the axial conveyor to the transverse conveyor comprising a series of spaced screw-like cam members disposed in alignment with said axial conveyor with their axes substantially perpendicular thereto and alongside of said transverse conveyor, said cam members having hubs, continuous threads extending from the hubs having three spaced flange portions that are substantially perpendicular to the axes of the cams and in idle position of the cams define two unobstructed passageways, the first being in alignment with said axial conveyor and the second parallel thereto and disposed between said axial conveyor and said transverse conveyor, said threads having ramps extending between and connected to the flange portions that, upon rotation of said cams through one complete revolution in a direction opposed to the longitudinal movement of the lengths, engage a length disposed in said first passageway to move said length bodily transversely of its axis into said second passageway and engage a length in said second passageway to move it onto said transverse conveyor and means for rotating said cams in said direction through a single revolution and stopping them in said idle position.

4. Apparatus according to claim 3 wherein said ramps extend through about 270° of the circumference of the cams between said flange portions.

References Cited in the file of this patent
UNITED STATES PATENTS

| 1,413,600 | Lewis | Apr. 25, 1922 |
| 2,726,754 | Rodder | Dec. 13, 1955 |